(12) United States Patent
Fost et al.

(10) Patent No.: US 6,228,967 B1
(45) Date of Patent: *May 8, 2001

(54) ORGANOSILICONE HAVING A CARBOXYL FUNCTIONAL GROUP THEREON

(75) Inventors: Dennis L. Fost, Ridgewood; Abe Berger, Summit, both of NJ (US)

(73) Assignee: Mona Industries, Inc., Paterson, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/167,167

(22) Filed: Oct. 6, 1998

Related U.S. Application Data

(63) Continuation-in-part of application No. 08/651,730, filed on May 22, 1996, now Pat. No. 5,817,730.

(51) Int. Cl.[7] .................................................. C08G 77/04
(52) U.S. Cl. ................................ 528/26; 528/25; 528/38; 548/406
(58) Field of Search ................................ 528/26, 25, 38; 548/406

(56) References Cited

U.S. PATENT DOCUMENTS 5,817,730 * 10/1998 Berger et al. ........................ 528/26

* cited by examiner

Primary Examiner—Robert Dawson
Assistant Examiner—Jeffrey B. Robertson
(74) Attorney, Agent, or Firm—Polly E. Ramstad; Franklyn Schoenberg

(57) ABSTRACT

Polysiloxane composition is provided having the formula:

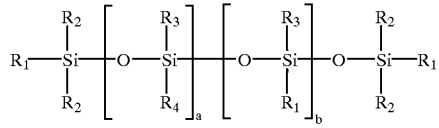

wherein:

$R_1$, which can be the same or different, is selected from $R_2$, an amine containing group of the formula —$(CH_2)_n$—$F_{n1}$—$B_{n2}$F—$NH_2$ or a functional group of the general formula:

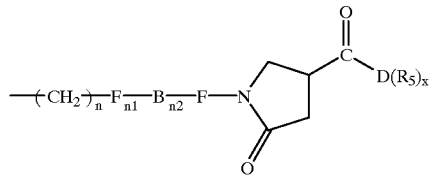

wherein at least one $R_1$ is a pyrrolidone-containing ester or amide functional group as shown;

$R_5$ is hydrogen, alkyl or polyoxyalkylene; D is oxygen or nitrogen, x is 1 or 2, F is linear or branched alkylene; B is —$NR_9$, oxygen or sulfur, wherein $R_9$ is hydrogen or lower alkyl ($C_{1-6}$);

$R_2$ can be the same or different and is selected from alkyl, aryl, alkenyl or alkeynyl;

$R_3$ and $R_4$, which may be the same or different are selected from alkyl, aryl, capped or uncapped polyoxyalkylene, alkaryl, aralkylene or alkenyl;

a is an integer from 0 to 50,000; and
b is an integer from 0 to 100.

18 Claims, No Drawings

ORGANOSILICONE HAVING A CARBOXYL FUNCTIONAL GROUP THEREON

RELATED APPLICATION

This application is a continuation in part of applications Ser. No. 08/651,730 filed May 22, 1996, now U.S. Pat. No. 5,817,730.

FIELD OF THE INVENTION

The present invention relates to novel organosilicone compositions and, more particularly, to silicone compositions having a carboxyl functional group thereon.

BACKGROUND OF THE INVENTION

While some carboxyl functional organosilicones are known, they are generally difficult and expensive to prepare and the commercial use thereof has therefore been limited. Heretofore, no convenient method for preparing polysiloxanes containing functional carboxylic acid groups is known and generally routes for their preparation have generally been used, including hydrosilylation of an unsaturated ester followed by hydrolysis, or alternatively, by hydrolysis of nitrile-containing silicone fluids. However, polysiloxanes containing one or more functional groups such as amino groups are well known and have been used in a variety of commercial applications but none of such polysiloxanes also contain functional carboxyl groups. Accordingly, the development of a method for readily preparing polysiloxanes containing one or more functional carboxyl groups would be desirable and it would be particularly advantageous if such method employed more readily available materials such as amino functional polysiloxanes for not only preparing carboxyl functional polysiloxanes but a variety of organosilicone derivatives thereof as well, including ester, amide and the like derivatives of silicone-containing compositions.

While, as indicated, certain polysiloxanes containing functional carboxylic acid groups and methods for preparing the same have heretofore been suggested, there is no disclosure or suggestion of the novel pyrrolidone-containing carboxyl functional silicone compositions described in copending application Ser. No. 08/651,730, now U.S. Pat. No. 5,817,730 of which the present application is a continuation in part, or of the novel ester and amide derivatives of pyrrolidone-containing carboxyl functional silicone compositions of the present invention.

SUMMARY OF THE INVENTION

It is accordingly an object of the present invention to provide novel organosilicone compositions having at least one pyrrolidone-containing carboxyl functional group thereon and ester and/or amide derivatives thereof.

It is another object of the present invention to provide a method for readily preparing organosilicone compositions having at least one pyrrolidone-containing carboxyl functional group thereon.

It is a further object of the present invention to provide improved cosmetic and personal care preparations which include novel carboxyl-functional silicone-containing compositions and/or ester or amide derivatives thereof.

In accordance with the present invention, there has now been discovered novel polysiloxanes containing one or more carboxylic acid groups and the ester and/or amide derivatives thereof that may be represented by the following general formula:

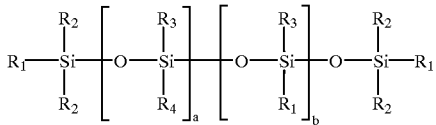

wherein:

$R_1$, which can be the same or different, can be selected from $R_2$, a primary amine containing group, and a pyrrolidone containing ester or amide functional group of the formula:

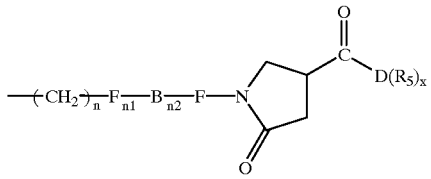

wherein at least one of $R_1$ is a pyrrolidone containing ester or amide functional group as shown; F, which can be the same or different, is linear or branched alkylene of 1–12 carbon atoms; $R_2$ is as defined below; D can be nitrogen or oxygen; $R_5$ can be hydrogen, alkyl or capped or uncapped polyoxyalylene; x is 1 or 2, with the proviso that if D is oxygen, x is 1, and when x is 2 $R_5$ can be the same or different; n is zero or 2; $n^1$ is zero or 1; $n^2$ is zero or 1; and B is —$NR_9$, sulfur (S) or oxygen (O), wherein $R_9$ is hydrogen or lower alkyl ($C_{1-6}$), with the proviso that when n is 0 and $n^2$ is 1, $n^1$, is 1, when n is 2 and $n^2$ is 1, $n^1$ is 0 or 1 and when n is 2 and $n^2$ is 0, $n^1$ is 0;

$R_2$ can be the same or different and can be selected from alkyl, aryl, alkenyl, or alkynyl;

$R_3$ and $R_4$, which may be the same or different, are selected from alkyl, aryl, capped or uncapped polyoxyalkylene, alkaryl, aralkylene, alkenyl or alkynyl;

a can be an integer from 0 to 50,000; and b can be an integer from 0 to 100.

In another aspect of the present invention there is provided a method for preparing polysiloxanes containing one or more pyrrolidone-containing functional carboxylic acid groups and/or the ester and amide thereof, which comprises first reacting an organosilicone fluid or composition having at least one primary amine functional group with itaconic acid or an ester thereof at an elevated temperature (preferably from about 90° C. to about 130° C.) for a time sufficient to react, preferably substantially completely react (generally ranging from about 1–5 hours), the itaconic acid or ester derivative thereof with the functional primary amine group(s) on the silicone fluid or composition to form an organosilicone composition having at least one pyrrolidone-containing carboxyl functional group.

In yet another aspect of the present invention there is provided an alternate method for preparing polysiloxanes containing one or more ester derivatives of carboxylic acid pyrrolidone groups which comprises reacting an organosilicone fluid or composition having one or more hydride groups (terminal or lateral) on the polysiloxane chain with an N-alkenyl carboalkoxyl group containing a pyrrolidone nucleus portion in the presence of a noble metal catalyst, preferably soluble platinum catalyst, at an elevated temperature (preferably between about 65° C. and 130° C.) for the time sufficient to react, preferably substantially completely react, the hydride groups on the silicone fluid or composition with the pyrrolidone group.

In a still further aspect of the present invention there are provided cosmetic and personal care compositions comprising from about 0.1% to about 10%, preferably from about 1% by weight of pyrrolidone-containing carboxyl functional organosilicone compositions and ester and amide derivatives thereof.

DESCRIPTION OF THE PREFERRED EMBODIMENTS

In accordance with the present invention there are provided novel polysiloxanes comprising a class of functional polysiloxanes which may be represented by the general formula:

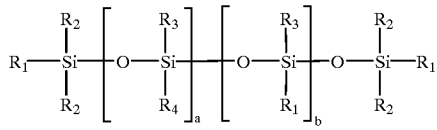

wherein:
$R_1$, which can be the same or different, can be selected from $R_2$, a primary amine containing group, preferably of the formula $-(CH_2)_n-F_{n1}-B_{n2}-F-NH_2$, and a pyrrolidone containing ester or amide functional group of the general formula:

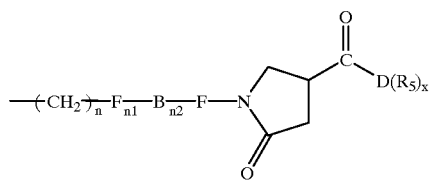

wherein at least one $R_1$ is a pyrrolidone-containing ester or amide functional group as shown; F, which can be the same or different, is linear or branched alkylene of 1–12 carbon atoms, preferably ethylene, propylene or isobutylene; $R_2$ is as defined below; D is nitrogen or oxygen; $R_5$ is hydrogen, saturated or unsaturated, branched or straight chain, substituted or unsubstituted alkyl of 6 to 22 carbon atoms or capped or uncapped polyoxyalkylene, preferably derived from ethylene oxide, propylene oxide or mixtures of the same of 6 to 22 carbon atoms; x is 1 or 2 with the proviso that if D is oxygen, x is 1, and when x is 2, $R_5$ can be the same or different; n is 0 or 2; $n^1$ is 0 or 1; $n^2$ is 0 or 1; and B is $-NR_9$, sulfur (S) or oxygen (O), wherein $R_9$ is hydrogen or lower alkyl ($C_{1-6}$); with the proviso when n is 0 and $n^2$ is 1, $n^1$ is 1, when n is 2 an $n^2$ is 1, $n^1$ is 0 or 1 and when n is 2 and $n^2$ is 0, $n^1$ is 0;

$R_2$ can be the same or different and can be selected from alkyl, aryl, alkenyl and alkynyl;

$R_3$ and $R_4$, which may be the same or are selected from alkyl, aryl, capped or uncapped polyoxyalkylene, alkaryl, aralkylene, alkenyl or alkynyl;

a can be an integer from 0 to 50,000;

b can be an integer from 0 to 100; with the proviso that when a is zero, all $R_1$ can be the same or different pyrrolidone-containing ester or amide functional groups or only the terminal $R_1$ groups are $R_2$ groups, and $R_3$ can be the same or different than the $R_2$ groups.

It is evident from the general formula above that the polysiloxane compositions of the present invention have one or more pyrrolidone-containing functional ester or amide group(s) linked terminally, laterally or both terminally and laterally to the silicone (polysiloxane) chain through a hydrocarbon linkage which may contain a hetero atom.

The polysiloxane compositions according to the present invention are useful, for example, as additives for cosmetic and personal care formulations, home and car care products, as well as precursors for silicone-containing compositions suitable for use in a wide range of personal care and home care products, fiber treating and metal treating agents and the like which impart such advantages as improved feel, substantivity, reduced surface tension, and anti-stick characteristics.

The carboxyl functional polysiloxanes from which the ester and amide derivatives of the present invention can be prepared, surprisingly and unexpectedly can be readily prepared by the reaction of corresponding silicone compositions or fluids having one or more functional primary amine groups including diamine groups containing funtional primary amine groups with up to about one equivalent, preferably about stoichiometric quantities, of itaconic acid or its ester per functional primary amine group(s) at an elevated temperature for the time sufficient for substantially all of the itaconic acid or its ester to react with the functional primary amine group(s). In general from at least about 0.5, preferably, from about 0.9 to about 1.1 equivalents of itaconic acid or its ester per functional primary amine group is reacted with the silicone fluid wherein substantially all the itaconic acid and preferably all the functional primary amine group(s) is reacted and a polysiloxane composition with at least one pyrrolidone containing functional carboxyl group (s) and/or its ester are formed.

The reaction can be carried out neat or in an inert solvent such as alcohol, hydrocarbon solvent, chlorinated hydrocarbon and the like, as desired, in general, at elevated temperature up to about 175° C., preferably from about 90° C. to about 130° C. The reaction readily proceeds and generally complete reaction of the itaconic acid or its ester with the available functional primary amine group(s) occurs in the Michael Addition Reaction manner with the double bond of the itaconic acid followed by immediate cyclization to form a pyrrolidone group with will occur in from about 1 to 5 hours. Routine analytical techniques for amine and acid values as well as monitoring water and/or alcohol evolution being used to determine completion of the reaction.

Amine functional silicone fluids suitable for use in accordance with the practice of the invention, having one or more primary amine functional group(s), including diamine group (s) that contain a primary amine group(s), which may be linked terminally, laterally or both terminally and laterally, as desired via an alkylene linkage to silicon, are well known and are available commercially, for example, from Dow Corning, Th. Goldschmidt AG and Shin-Etsu. While the equivalent weight of the silicone fluids or compositions which may be employed in the preparation of the polysiloxanes of the present invention is not critical, and suitable compositions may have equivalent weights of 12,000 or even higher, although silicone fluids having equivalent weights from about 500 to about 10,000 are in general preferred.

As indicated, the polysiloxane compositions of the present invention are readily prepared by reaction of primary amine functional silicone fluids with itaconic acid or its ester. Itaconic acid (methylene succinic acid) is a compound of the formula:

wherein $R_9$, which can be the same or different, is hydrogen or lower alkyl (1–6 carbon atoms).

The compound itaconic acid is available commercially from Rhone Pouleuc and Pfizer Chemicals Division whereas ester derivatives thereof are available from Morflex Inc., Greensboro, N.C. The compounds are produced by known fermentation techniques although chemical synthesis methods are also known.

The pyrrolidone-containing ester derivatives of the present invention can be prepared using known conventional methods such as by reacting the pyrrolidone-containing carboxylic functional siloxane compositions herein described with a straight or branched, saturated or unsaturated, substituted or unsubstituted free alcohol having from 6 to 22 carbon atoms or a monoalkyl capped polyether alcohol preferably derived from ethylene oxide, propylene oxide and mixtures of the same having from 6 to 22 carbon atoms in the presence of mineral acid catalysts or alternatively by the reaction of an alkali metal salt of the pyrrolidone-containing carboxylic acid with a desired alkyl halide. Also suitable may be transesterification of higher boiling alcohols with lower ester derivatives of the carboxylic acid using Lewis acid catalysts such as titanates.

Pyrrolidone-containing amide derivative compositions of the present invention may be prepared by generally conventional techniques such as by the high temperature condensation reaction (about 150°–170° C.) of pyrrolidone-containing acids as herein described with a variety of functional amines or the reaction of a pyrrolidone-containing or ester as herein described and a functional amine in the presence of an alkali metal catalyst. Functional amines that are suitable for use in preparing the pyrrolidone-containing amide derivative compositions of the present invention are any saturated or unsaturated, branched or straight, substituted or substituted amines containing a functional primary or secondary amine group of from 6 to 22 carbon atoms. Alkyl capped polyoxyalkylene amines having a primary amine functional group derived from ethylene and propylene oxide polymers are also be suitable.

The carboxyl-functional polysiloxanes, and the ester and amide derivatives thereof, of the present invention can also be readily prepared by a hydrosilylation reaction wherein a silicone fluid or composition having one or more hydride substituents on the silicone chain (terminal, lateral or combination or terminal and lateral) is added to a N-alkenyl carboalkoxy containing a pyrrolidone nucleus in the presence of a noble metal (Group VIII metal) catalyst, preferably soluble platinum, at an elevated temperature (65° C. to 130° C.) for a time sufficient for substantially all of the N-alkenyl carboalkoxy containing pyrrolidone to react with the hydride group(s). The N-alkenyl carboalkoxy containing pyrrolidone reactant can have a N-allyl or higher olefinic group of 3 or more carbon atoms which can also include at least one hetero atom. The reaction can be carried out neat or in inert solvents such as toluene, benzene, chlorobenzene, heptane and the like. In general, from about 0.5 up to about one equivalent, preferably from about 0.9 to about 1.1 equivalents of the N-alkenyl pyrrolidone groups per functional hydride groups is reacted with the silicone fluid wherein substantially all the N-alkenyl carboalkoxy containing pyrrolidone and, preferably all of the functional hydride groups are reacted. Suitable platinum catalysts include solubilized platinum or platinum metal on inert supports such as alumina, charcoal and the like. In general from about $10^{-3}$ to $10^{-6}$ moles of platinum per mole of hydride group can be used.

The novel pyrrolidone-containing functional ester and/or amide polysiloxane compositions of the invention display many of the well known properties of silicone fluids such as emolliency, emulsification, anti-stick, smoothing, substantivity, lubricating and surfactancy properties. Thus, such compositions can be readily incorporated into a variety of products such as personal care and home care formulations as well as many other compositions that provide long-lasting effects on various substrates such as skin, hair, natural and synthetic fibers (textiles), plastics, metals, paper and the like.

It is therefore a further aspect of the invention to use the novel compositions of the invention, for example, in cosmetic and the like personal care preparations, especially for skin treatment and hair care; car and home care products, especially for metal and floor surface cleaning and protection, and the like.

In this connection, personal care formulations can be skin-treatment treatment cremes and lotions, hair conditioners and after-bath skin moisturizers, depending on whether the emphasis is on the conditioning effect or on the cleaning effect including the effect on better combability in hair care products. Other formulations where the unique properties of the novel compositions of the invention can be utilized include make-up cremes, sunscreens, lipstick, pressed powders, skin-toners, deodorants, antiperspirants and the like. Personal care preparations to which the novel polysiloxane compositions of the invention have been added in amounts of 0.1 to 10 weight percent, and which can contain other additives including other silicone fluids, provide skin treating products with non-irritating, non-greasy film on the skin that does not evaporate and therefore provides long lasting protection. In hair care products, such as, hair tonics or hair sprays, the composition of the invention in amounts of 0.1 to 5% or 10% bring about a significant improvement in combability of the hair as well as development of fullness and gloss.

Conventional additives, such as thickeners, perfumes, presevatives, complexing agents, opacifiers, luster development agents and the like may be added to the personal and hair care products.

In addition, the novel polysiloxane compositions of the invention demonstrate useful metal and floor surface cleansing and protection properties when incorporated into home and car care products. As a component of floor and car surface wax products in an amount of from 1% to 10%, they form a non-greasy glossy film on the surface which does not evaporate and is resistant to weather and cleansing agents, therefore providing long lasting protection.

Among other advantages of the novel polysiloxane compositions of the invention are their usefulness as paper and textile sizing and lubricating agents; treating agents for fillers, paper and plastics; coatings for glass, plastics and minerals; anticorrosion agents for metal products; adhesion promoters for metal primers and paints and the like.

The preparation of specific compositions of the invention is illustrated by the following specific examples which are provided herein for purposes of illustration only and are not intended to limit the scope therein.

EXAMPLE 1

An alpha-omega diamino functional polysiloxane fluid obtained commercially under the designation Tegomer A-Si2120 from Goldschmidt Company is used in this example. The amine content of the fluid is 3.5% which corresponds to a molecular weight of 914.

91.4 grams of the above polysiloxane fluid (0.1 moles) is admixed with 26 grams (0.2 moles) of Itaconic Acid in a reaction vessel. Upon combination of the reactants, a heterogeneous mixture is formed. External heat is applied to the reaction vessel bringing the reaction mixture to a temperature of about 110° C., whereupon the reaction mixture becomes completely homogeneous while the temperature rises to 140° C.

After a heating period of 4 hours, a total of 7.5 ml of volatiles are collected. The acid value of the reaction mixture is 81.6 (theoretical 95.5) while the alkali number is nil, thus confirming that there is the presence of carboxyl groups on the product.

EXAMPLE 2

An alpha, omega-Bis primary amino alkyl dimethyl polysiloxane fluid with an average molecular weight about 1579.5 and having the general formula:

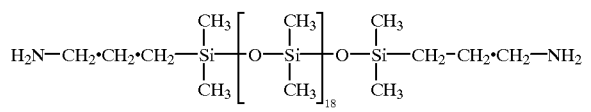

obtained commercially from Shin-Etsu under the designation X-22161A is used in this example.

A mixture of 994.5 grams of the above polysiloxane fluid (0.6296 moles) and 163.7 grams (1.25 moles) of Itaconic Acid is formed in a reaction vessel and heated (slowly to about 90° C. at which point an exotherm occurs raising the reaction vessel temperature to 130° C. and water starts to evolve.

The reaction mixture is heated to and maintained at a temperature of 140° C. to 150° C. for a period of 3 hours during which time about 20 ml. of water and other volatiles are collected. A clear, yellow viscous liquid is formed having an alkali number of 0.

EXAMPLE 3

A lateral (pendant) amino functional silicone fluid having an average molecular weight of about 3720 obtained from Shin-Etsu under the product designation KE-864 is used in this example.

A mixture of 377 grams (0.1013 moles) of the silicone fluid and 13.2 grams (0.1013 moles) of Itaconic acid is formed in a reaction vessel and heated to a temperature of 160° C. for about two hours.

A clear melt is formed having an acid number of 11.6 (theoretical 14.6).

EXAMPLE 4

A pendant (lateral) amino functional silicone fluid having an average molecular weight of 4400 obtained from Shin-Etsu under the product designation KF865 is used in this example.

88 grams (0.02 moles) of the silicone fluid is admixed with 2.6 grams of Itaconic acid (0.02 moles) and heated to a temperature of 130°–140° C. whereupon a clear melt is obtained and then continued heating for an additional two hours.

EXAMPLE 5

This example illustrates an alternate procedure of preparing a polysiloxane composition having at least one pyrrolidone containing carboxyl functional group(s).

A mixture of 122.4 grams of octamethylcyclotetrasiloxane, 13.4 grams of tetramethyldisiloxane, 0.7 grams of activated charcoal and 0.07 grams concentrated sulfuric acid are charged into a reaction vessel and heated with agitation to 65° C. for 24 hours. The mixture is filtered and the filtrate is subjected to reduced pressure at 70° C. for 48 hours. A colorless liquid is obtained having a number average molecular weight of about 1580 which is terminated in silicon hydride as determined by NMR.

A solution of 15.8 grams (0.1 mole) of dimethyl itaconate in 30 ml of methanol is added at ambient to a reaction vessel containing a solution of 5.7 grams (0.1 mole) alylamine in 10 ml methanol. Upon complete addition of the dimethyl itaconate, a mild exotherm is produced raising the reaction mixture temperature to 55° C. Following this, the reaction mixture is held at reflux for 3 hours. The reaction mixture is stripped of solvent and the product (N-allyl 4 carbonmethoxy pyrrolidone) is isolated by distillation of 115° C. A colorless liquid is obtained in 85% yield.

158 grams of the silicone hydride terminated polysiloxane material prepared above is charged to a reaction vessel and 1 ml of a 0.1N chloroplatinic acid solution in tetrahydrofurane (THF) is added thereto. The reaction mixture is heated to 90–95° C., the heat source is removed and 36.6 grams (0.2 Equivalents) of the itaconate/allylamine reaction product prepared above is added to the reaction vessel. After a brief induction period, the temperature of the mixture starts to rise slowly and the reaction temperature is controlled between 110–115° C. by the rate of addition. Following complete addition of the pyrrolidone reaction product, the reaction mixture is heated at 120° C. for 3 hours.

Analysis of the reaction product indicates complete absence of Silicone-Hydride absorption and allylic unsaturated is also absent. NMR analysis confirms that the resulting reaction product is an alpha-Omega capped carbomethoxy pyrrolidone containing silicone fluid.

EXAMPLE 6

An aminofunctional siloxane fluid capped at both ends with a trimethylsilyl group having an average equivalent weight of 4675 and alkali number of 12 which is available commercially from Dow Coming Corp. under the trade designation DC 2-2136 is used in this example.

A mixture of 93.4 grams of the above polysiloxane fluid (10.02 equivalents) and 606 grams of Bis Dodecyl Itaconate is charged into a reaction vessel and slowly heated to about 130–140° C. under nitrogen. The reaction mixture is kept at that temperature for about 2 hours when the alkali number of the reaction mixture is less than 0.5. A vaccum of about 50 mm is applied and the temperature is raised until Dodecyl alcohol is distilled from the reaction mixture. After about 1 hour all the volatiles are collected and the reaction mixture is cooled. The alkali number of the reaction product is about 0.2 and IR shows ester and amide absorption.

EXAMPLE 7

A sample of the trimethylsiloxy capped polysiloxane fluid of example 6 is used in this example.

The polysiloxane fluid is reacted with a stoichiometric amount of Itaconic acid to form a liquid reaction product having an acid number of 11. A mixture of 102 grams of the above reaction product and 24 grams of 15 ethanolamine is charged into a reaction vessel and then heated to about 160–170° C. over a period of 4 hours under nitrogen. Water is seen to evolve. When the acid number of the reaction mixture is less than 0.5, the mixture is subjected to reduced pressure of 30 mm at a temperature of 100° C. to remove excess ethanolamine. After about an hour, the acid and alkali number of the reaction product are each less than 0.2. A pale yellow fluid reaction product is obtained which is soluble in alcohol and a number of solvents.

Although some preferred embodiments have been described, many modifications and variations may be made thereto in light of the above teachings. It is therefore to be understood that within the scope of the appended claims, the invention may be practiced otherwise than as specifically described and illustrated

What is claimed is:

1. A polysiloxane composition having the formula $$R_1-\underset{\underset{R_2}{|}}{\overset{\overset{R_2}{|}}{Si}}-O-\left[\underset{\underset{R_4}{|}}{\overset{\overset{R_3}{|}}{Si}}-O\right]_a\left[\underset{\underset{R_1}{|}}{\overset{\overset{R_3}{|}}{Si}}-O\right]_b\underset{\underset{R_2}{|}}{\overset{\overset{R_2}{|}}{Si}}-R_1$$

wherein:
  $R_1$, which can be the same or different, is selected from $R_2$, a diamine containing group of the formula $(CH_2)_n-F_{n1}-B_{n2}-F-NH_2$ and a pyrrolidone-containing group of the general formula:

$$-(CH_2)_n-F_{n1}-B_{n2}-F-N\underset{}{\overset{}{\bigg\langle}}\text{pyrrolidone with }D(R_5)_x$$

wherein at least one $R_1$ is a pyrrolidone containing ester or amide derivative group as shown;
  D is nitrogen or oxygen;
  x is 1 or 2 with the proviso that if D is oxygen, x is 1
  $R_5$ is linear or branched, saturated or unsaturated, substituted or unsubstituted alkyl of 6 to 22 carbon atoms or capped or uncapped polyoxyalkylene of 6 to 22 carbon atoms;
  F is linear or branched alkylene of 1–12 carbon atoms;
  B is $-NR_9$, sulfur or oxygen wherein $R_9$ is hydrogen or an alkyl;
  n is zero or 2; $n^1$ is zero or 1 and $n^2$ is zero or 1; with the proviso that when n is zero and $n^2$ is 1, $n^1$ is 1, when n is 2 and $n^2$ is 1, $n^1$ is 0 or 1 an when n is 2 and $n^2$ is 0, $n^1$ is zero;
  $R_2$ can be the same or different and is selected from alkyl, aryl alkenyl or alkynyl;
  $R_3$ and $R_4$, which may be the same or different are selected from alkyl, aryl, capped or uncapped polyoxyalkylene, alkaryl, aralkylene or alkenyl;
  a is an integer from 0 to 50,000; and
  b is an integer from 0 to 100; with the proviso that when a is zero, all $R_1$ can be the same or different pyrrolidone-containing groups or only the terminal $R_1$ groups are $R_2$ groups, and $R_3$ can be the same or different than the $R_2$ groups.

2. The polysiloxane composition as claimed in claim 1, wherein $R_5$ is saturated or unsaturated, branched or straight chain, substituted or unsubstituted alkyl of 6–22 carbon atoms.

3. The polysiloxane composition as claimed in claim 2, wherein D is oxygen.

4. The polysiloxane composition as claimed in claim 2, wherein D is nitrogen.

5. The polysiloxane composition as claimed in claim 1, wherein $R_5$ is capped or uncapped polyoxyalkylene.

6. The polysiloxane composition as claimed in claim 5, wherein D is oxygen.

7. The polysiloxane composition as claimed in claim 5, wherein D is nitrogen.

8. The polysiloxane composition as claimed in claim 1, wherein $R_1$ is $R_2$ or a pyrrolidone-containing ester or amide group and at least one of $R_1$ is a pyrrolidone-containing ester or amide group.

9. The polysiloxane composition as claimed in claim 1, wherein at least one terminally linked $R_1$ is pyrrolidone containing ester or amide group.

10. The polysiloxane composition as claimed in claim 1, wherein $R_3$ and $R_4$ are methyl and a is at least 1.

11. The polysiloxane composition as claimed in claim 1, wherein both terminal $R_1$ groups are $R_2$ and a and b are each at least 1.

12. The polysiloxane composition as claimed in claim 1, wherein $R_2$, $R_3$ and $R_4$ are methyl.

13. The polysiloxane composition as claimed in claim 1, wherein $R_9$ in the $R_1$ group is hydrogen.

14. The polysiloxane composition is claimed in claim 1, wherein when a is zero, all the $R_1$ groups are the same.

15. The polysiloxane composition as claimed in claim 1, wherein when a is zero, the $R_3$ groups can be the same or different than the $R_2$ groups.

16. The polysiloxane composition as claimed in claim 1, wherein when a is zero, the $R_3$ groups are the same as the $R_2$ groups.

17. The polysiloxane as claimed in claim 1, wherein B is $-NR_9$.

18. A personal care and cosmetic composition comprising at least 0.1% of a polysiloxane composition as claimed in claim 1.

* * * * *